US012332852B1

(12) United States Patent
Chinni et al.

(10) Patent No.: US 12,332,852 B1
(45) Date of Patent: Jun. 17, 2025

(54) TECHNIQUES FOR HANDLING SCHEMA MISMATCH WHEN MIGRATING DATABASES

(71) Applicant: Rubrik, Inc., Palo Alto, CA (US)

(72) Inventors: Manjunath Chinni, Saratoga, CA (US); Veera Venkata Naga Rama Satyam Kandula, San Jose, CA (US); Jiangbin Luo, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/674,616

(22) Filed: May 24, 2024

(51) Int. Cl.
*G06F 16/21* (2019.01)

(52) U.S. Cl.
CPC .......... *G06F 16/213* (2019.01); *G06F 16/214* (2019.01)

(58) Field of Classification Search
CPC .............................. G06F 16/213; G06F 16/214
USPC ......................................................... 707/803
See application file for complete search history.

(56) References Cited

U.S. PATENT DOCUMENTS

| | | | |
|---|---|---|---|
| 9,436,712 B2* | 9/2016 | Srinivasan | G06F 16/254 |
| 10,747,585 B2* | 8/2020 | Halter | G06F 16/214 |
| 10,977,275 B1* | 4/2021 | Bauer | G06F 16/2379 |
| 11,016,954 B1* | 5/2021 | Babocichin | G06F 16/258 |
| 2009/0024582 A1* | 1/2009 | Chung | H04L 51/214 |
| 2019/0235918 A1* | 8/2019 | Liu | G06F 3/0617 |
| 2020/0125540 A1* | 4/2020 | Thatte | G06F 16/211 |
| 2020/0167323 A1* | 5/2020 | Swamy | G06F 16/256 |
| 2022/0171748 A1* | 6/2022 | Bamel | G06F 11/1464 |
| 2022/0414069 A1* | 12/2022 | Luong | G06F 16/2358 |
| 2023/0047056 A1* | 2/2023 | Chang | G06F 3/0604 |
| 2023/0081590 A1* | 3/2023 | Rudrabhatla | G06F 3/0652 711/154 |
| 2023/0401182 A1* | 12/2023 | Luo | G06F 9/45558 |

FOREIGN PATENT DOCUMENTS

WO  WO 2023/227921 A1 * 11/2023 ............. G06F 16/27

OTHER PUBLICATIONS

Volnes, Espen, et al., "To Migrate or Not to Migrate: An Analysis of Operator Migration in Distributed Stream Processing", IEEE Communications Surveys & Tutorials, vol. 26, Issue 1, Nov. 7, 2023, pp. 670-705.*

* cited by examiner

*Primary Examiner* — Robert Stevens
(74) *Attorney, Agent, or Firm* — Holland & Hart LLP

(57) ABSTRACT

Methods, systems, and devices for data management are described. A first data source may be identified to move from a source cloud deployment (that operates in accordance with a first release cadence for updating database schema) to a destination cloud deployment (that operates in accordance with second, different release cadence for updating database schema). The first source database is then migrated from the source cloud deployment to an intermediate cloud deployment hosted on the source cloud deployments that allows the schema of the first data source to remain unchanged for a duration of time that the first data source is hosted on the intermediate cloud deployment. The database schema associated with the first data source is then updated to an updated (most recent) database schema in accordance with the second release cadence of the destination cloud deployment, and migrated from the intermediate cloud deployment to the destination cloud deployment.

20 Claims, 9 Drawing Sheets

TECHNIQUES FOR HANDLING SCHEMA MISMATCH WHEN MIGRATING DATABASES

FIELD OF TECHNOLOGY

The present disclosure relates generally to data management, including techniques for techniques for handling schema mismatch when migrating databases.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
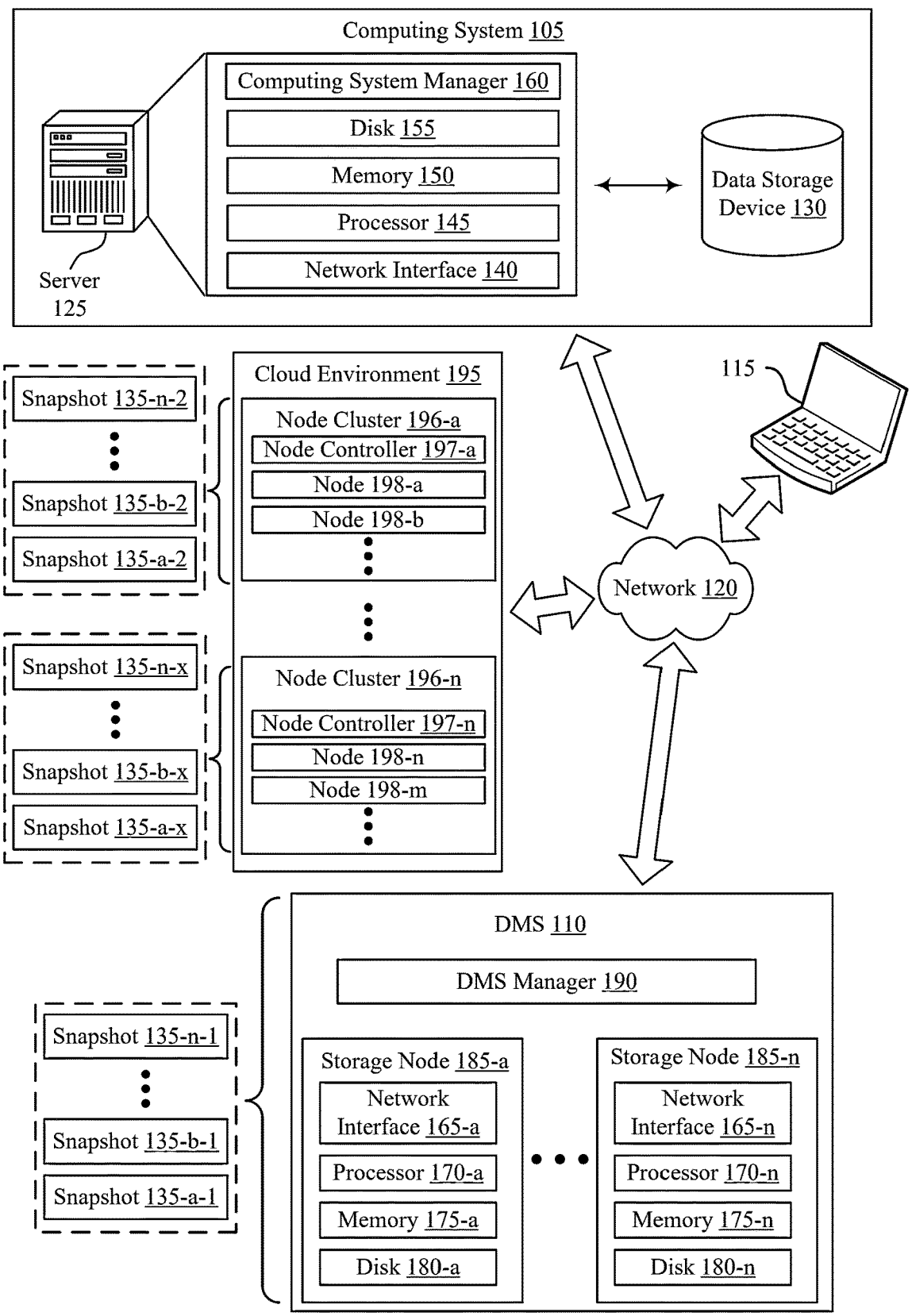
FIG. 1 illustrates an example of a computing environment that supports techniques for handling schema mismatch when migrating databases in accordance with aspects of the present disclosure.

Companies may have multiple different production deployments or databases that are hosted on different cloud environments or cloud deployments such as public cloud deployments and private cloud deployments. For example, in a public cloud deployment (such as Google cloud, Amazon Web Services cloud, or other services), resources are offered by a third-party provider via the internet and shared by organizations and individuals. In contrast, a private cloud deployment (such as a Federal Risk and Authorization Management Program (FedRAMP) clouds) may be subject to additional security protocols and standards to provide users and organizations with extra security and governance relative to the relatively unrestricted public cloud deployment. For example, a private cloud deployment may be supported by continuous monitoring, testing, reporting, and auditing of the cloud deployment.

In some implementations, different cloud deployment types (e.g., general public cloud and FedRAMP-compliant clouds) may run different versions of a software stack which includes database schema (e.g., the general structure of the database), which is periodically updated. In some cases, however, the rate at which database schema is updated in a public cloud deployment may be different from the rate at which the database schema is updated in the FedRAMP cloud deployment. For example, the database schema in the public cloud may be updated relatively more frequently than the database schema in the FedRAMP cloud. This schema mismatch may be undesirable whenever different databases are migrated between the public and FedRAMP cloud deployments.

In order to support efficient data migration between both public and private cloud deployments (or cloud deployments that have mismatched schema release cadences), a database or data source (that is hosted on a public cloud or a source cloud deployment) may be migrated to an intermediate deployment on the source cloud, which hosts databases that are awaiting transfer to the FedRAMP cloud deployment (or another different destination cloud deployment). Once the database is identified for moving to the destination cloud, the database may be first migrated to the intermediate deployment, which freezes any schema updates to the database (so that at the time that the database is moved to the intermediate deployment, its schema matches with the schema of the destination cloud). Then, once a next update to the schema on the destination cloud occurs, both the database on the intermediate cloud and the destination cloud are updated to the latest schema version, and the database is migrated from the intermediate cloud to the destination cloud. After migration, the database has a schema that matches with the schema of the destination cloud.

Aspects of the disclosure may be implemented to realize one or more potential advantages. In some aspects, the deployment of the intermediate cloud for hosting databases that are set to migrate to a destination cloud may support seamless transition between hosting a database on a public cloud and transferring the database to a private cloud or FedRAMP cloud. For example, the intermediate cloud may function to freeze the schema of the database on the public cloud until both the schema of the database and the schema of the FedRAMP cloud can be updated concurrently, which eliminates challenges of schema mismatch between different cloud deployments. Additionally, or alternatively, the techniques described herein may support forward compatibility for database migration, where data in the database is maintained and left unchanged during migration. Additionally, or alternatively, the techniques described herein may allow for a database to efficiently and reliably move from a deployment on a public cloud to a higher security private cloud, and vice versa.

FIG. 1 illustrates an example of a computing environment 100 that supports techniques for handling schema mismatch when migrating databases in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments or cloud deployments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Databases may be hosted on different cloud environments or cloud deployments (such as a cloud environment 195), which may be an example of a public or commercial cloud deployment or a private or high security cloud deployment. In some cases, however, different cloud deployments may support different update cadences for updating software features and database schema. For example, the database schema in a public cloud deployment may be updated relatively more frequently than the database schema of a private cloud. This schema mismatch may be undesirable whenever different databases are migrated between the public and private cloud deployments.

To support efficient data migration between both public and private cloud deployments (or cloud deployments that have mismatched schema release cadences), a database or data source (that is hosted on a public cloud or a source cloud deployment) may be migrated to an intermediate deployment on the source cloud, which hosts databases that are awaiting migration to a private cloud deployment. The intermediate deployment may freeze any schema updates to the database, and once a next update to the schema on the destination cloud occurs, both the database on the intermediate cloud and the destination cloud are updated to the latest schema version, and the database is migrated from the intermediate cloud to the destination cloud. After migration, the database has a schema that matches with the schema of the destination cloud.

Figure 2:
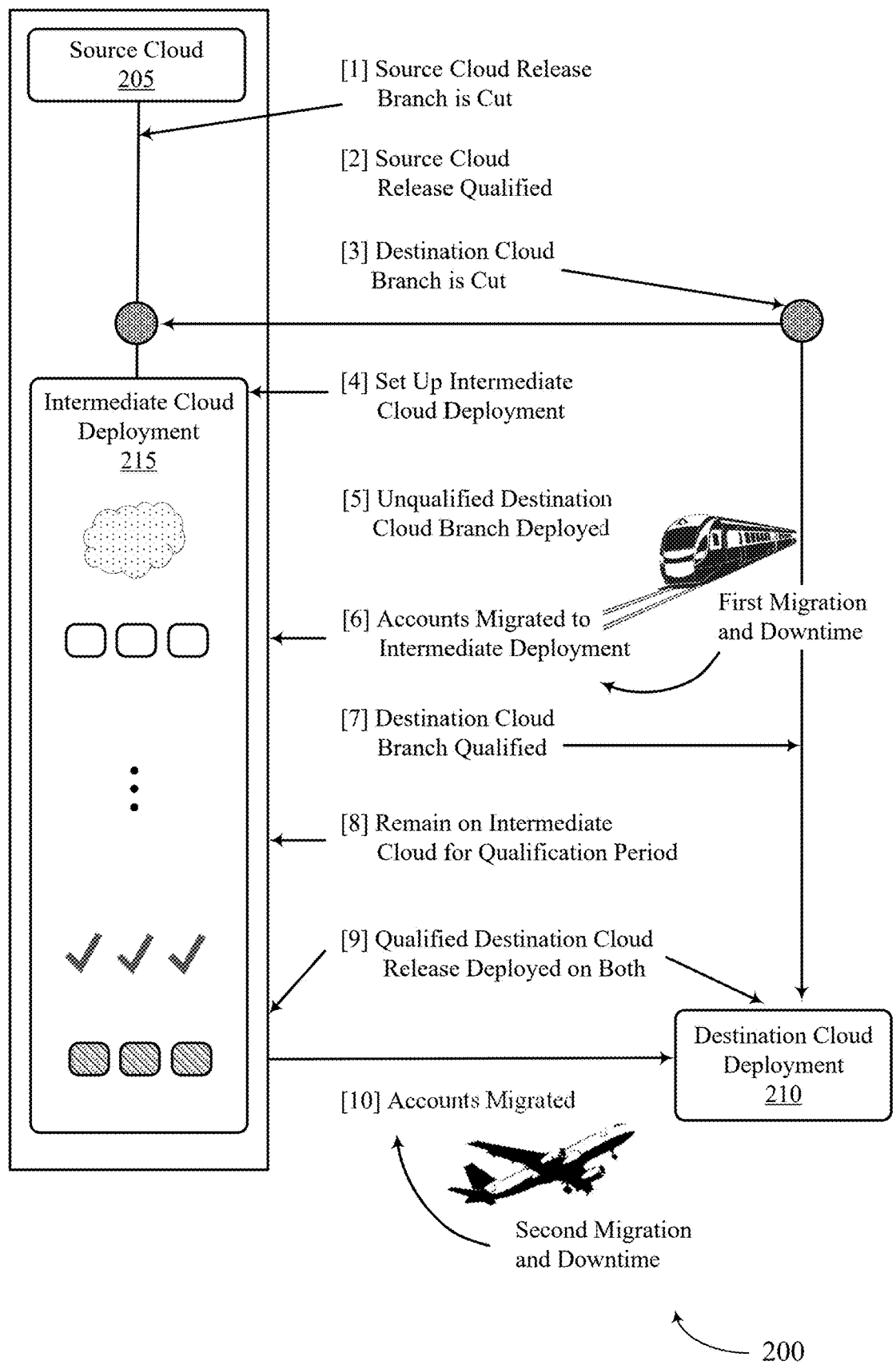
FIGS. 2 and 3 show example cloud deployment and data migration configurations that support techniques for handling schema mismatch when migrating databases in accordance with aspects of the present disclosure.

FIG. 2 shows an example of a cloud deployment and data migration configuration 200 that supports techniques for handling schema mismatch when migrating databases in accordance with aspects of the present disclosure. For example, the cloud deployment and data migration configuration 200 illustrates a process for migrating one or more data sources (e.g., databases) from a source cloud (such as a public cloud or a private cloud) to a destination cloud (such as a private cloud or public cloud) using an intermediate cloud deployment, which allows for the database schema associated with the one or more data sources to match with a corresponding schema of the destination cloud before migration.

Some companies (such as companies offering SaaS products) may support multiple different production deployments or data sources (e.g., databases) that are hosted on different cloud deployments. For example, a database may be hosted on public cloud deployment or a private cloud deployment. In a public cloud deployment (such as Google cloud, Amazon Web Services cloud, or other services), resources may be offered by a third-party provider via the internet and shared by organizations and individuals. In contrast, a private cloud deployment (such as a FedRAMP cloud) may be subject to additional security protocols and standards to provide users and organizations with extra security and governance relative to the relatively unrestricted public cloud deployment. In some aspects, a private cloud deployment may be supported by continuous monitoring, testing, reporting, and auditing of the cloud deployment, while a public cloud may offer relatively fewer security protocols.

In some implementations, different cloud deployment types (e.g., public cloud and FedRAMP-compliant clouds) may run different versions of a software stack which includes database schema (e.g., the general structure of the database), which is periodically updated. In some cases, however, the rate at which database schema is updated in a public cloud deployment (e.g., a schema release cycle) may be different from the rate at which the database schema is updated in the FedRAMP cloud deployment. For example, the database schema in the public cloud may be updated relatively more frequently than the database schema in the FedRAMP cloud (e.g., once a week updates for the public cloud versus one a quarter updates for the FedRAMP cloud). This schema mismatch may be undesirable whenever different databases are migrated between the public and FedRAMP cloud deployments since the public cloud deployments may be ahead in version relative to the FedRAMP cloud.

In order to support efficient data migration between both public and private cloud deployments (or cloud deployments that have mismatched schema release cadences), a database or data source that is hosted on a public cloud or a source cloud deployment 205 may be migrated to an intermediate cloud deployment 215 on the source cloud, which hosts databases that are awaiting transfer to the FedRAMP cloud deployment (or a destination cloud deployment 210), until the schema for the FedRAMP or the destination cloud deployment 210 catches up in version to the public cloud deployment or the source cloud deployment 205. Once the database is identified for moving to the destination cloud deployment 210, the database may be first migrated to the intermediate cloud deployment 215, which freezes any schema updates to the database (so that at the time that the database is moved to the intermediate deployment, its schema matches with the schema of the destination cloud deployment 210). Then, once a next update to the schema on the destination cloud occurs, both the database on the intermediate cloud deployment 215 and the destination cloud deployment 210 are updated to the latest schema version, and the database is migrated from the intermediate cloud deployment 215 to the destination cloud deployment 210. After migration, the database has a schema that matches with the schema of the destination cloud deployment 210.

Once a data source or a database is identified for migration from the source cloud deployment 205 to the destination cloud deployment 210, at step [1], the source cloud deployment release branch is cut for the database. At step [2], the source cloud deployment release is qualified, and at step [3], the destination cloud deployment branch is cut. At step [4], the intermediate cloud deployment 215 is set up or established at the source cloud deployment 205. At step [5], an unqualified destination cloud branch is deployed (which is qualified on the source cloud branch). At step [6], the database and all associated accounts may be migrated to the intermediate cloud deployment 215, and the database may experience a first downtime while the database is hosted on the intermediate cloud deployment 215 (and has a frozen schema). At step [7], the database begins a qualification period for migration to the destination cloud deployment 210. For example, if the database is moving from a public cloud to a FedRAMP cloud, the database may undergo various qualification, security, monitoring, and authorization procedures in order to support migration to the FedRAMP cloud. At step [8], the database may remain on the intermediate cloud deployment for a threshold duration of time, such as a time associated with a qualification period for deployment to the FedRAMP cloud (e.g., 4 weeks). During the threshold duration of time that the database is hosted at the intermediate cloud deployment 215, the intermediate cloud deployment may remain unchanged (e.g., no database schema updates may occur on the intermediate cloud deployment 215 during the threshold duration of time).

In some aspects, the database may remain hosted on the intermediate cloud deployment 215 until a next update to the database schema occurs at the destination cloud deployment. Then, at step [9], both database schemas are updated for the database hosted on the intermediate cloud deployment 215 and for the destination cloud deployment 210 so that both schemas match on the intermediate cloud deployment 215 and the destination cloud deployment 210. At step [10], the database is migrated from the intermediate cloud deployment 215 to the destination cloud deployment 210, with matching schema. In some aspects, the database may experience a second downtime during the second migration from the intermediate cloud deployment 215 to the destination cloud deployment 210. After migration, the intermediate cloud deployment may be discarded.

In some implementations, databases that are migrated from the source cloud deployment 205 to the destination cloud deployment 210 may experience two hops (e.g., two downtimes and migrations) from the source cloud deployment 205 to the intermediate cloud deployment 215, and then from the intermediate cloud deployment 215 to the destination cloud deployment 210. In some aspects, multiple databases or data sources may undergo migration, or the deployment and utilization of the intermediate cloud deployment 215 may be repeated for separate migrations of separate databases. In some cases, the holding of the databases at the intermediate deployment may effectively allow the schema release on the destination cloud to "catch up" or otherwise become the same as the schema release for the database on the source cloud, so that when migration occurs, there is no schema mismatch. The reduced likelihood for schema mismatch may allow for a more seamless and efficient procedure for database migration between cloud deployments.

Figure 3:
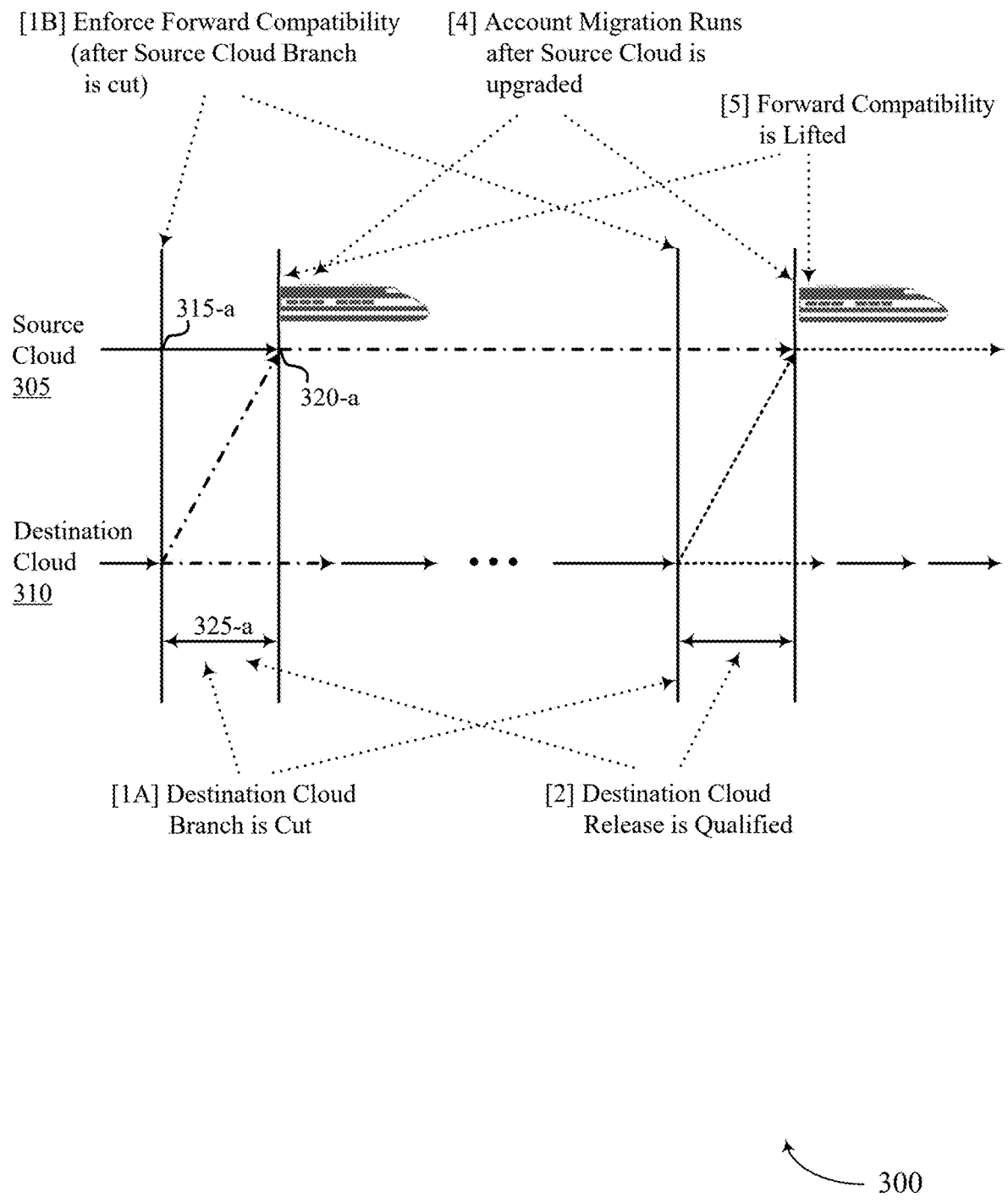

FIG. 3 shows an example of a cloud deployment and data migration configuration 300 that supports techniques for handling schema mismatch when migrating databases in accordance with aspects of the present disclosure. For example, the cloud deployment and data migration configuration 300 illustrates a process for migrating one or more data sources (e.g., databases) from a source cloud (such as a public cloud or a private cloud) to a destination cloud (such as a private cloud or public cloud) using an intermediate cloud deployment, which allows for the database schema associated with the one or more data sources to match with a corresponding schema of the destination cloud before migration.

A source cloud deployment 305 and a destination cloud deployment 310 may host different data sources or databases, and may support migration of data sources and data bases between deployments. In some implementations, a data source may be selected or identified for migration from the source cloud deployment 305 to the destination cloud deployment. At a first step (step [1A]), the destination cloud branch is cut, and at a second step (step [1B]) the source cloud deployment branch is cut, and forward compatibility design enforcement begins at 315-a, and spanning to 320-a (for the duration 325-a). In some aspects, the forward compatibility enforcement may implement various rules or standards for database migration between the source cloud deployment 305 and the destination cloud deployment 310. For example, the forward compatibility enforcement may ensure that no columns of data are dropped, renamed, or modified, no tables are dropped, no changes to primary keys or unique key constraints occur, no changes to column data type occurs, no data enumeration addition or removal occurs, and no default values are changed. In some implementations, the forward compatibility enforcement window may be up to 8 weeks in duration (with a first duration for qualification of the destination cloud deployment release, and a second duration for the database migration window).

At a third step (step [2]), the destination cloud deployment release is qualified for a qualification duration spanning 320-a. At a fourth step (step [3]) the source cloud deployment is upgraded and migrated to an intermediate deployment a fifth step (step [4]), where the database is maintained for a duration equal to a qualification release duration. At a sixth step (step [5]) the database is updated (concurrently with an update to the destination cloud deployment schema) and migrated from the intermediate deployment to the destination cloud deployment, where the schemas match. In some cases, the forward compatibility enforcement is lifted once migration occurs.

Figure 4:
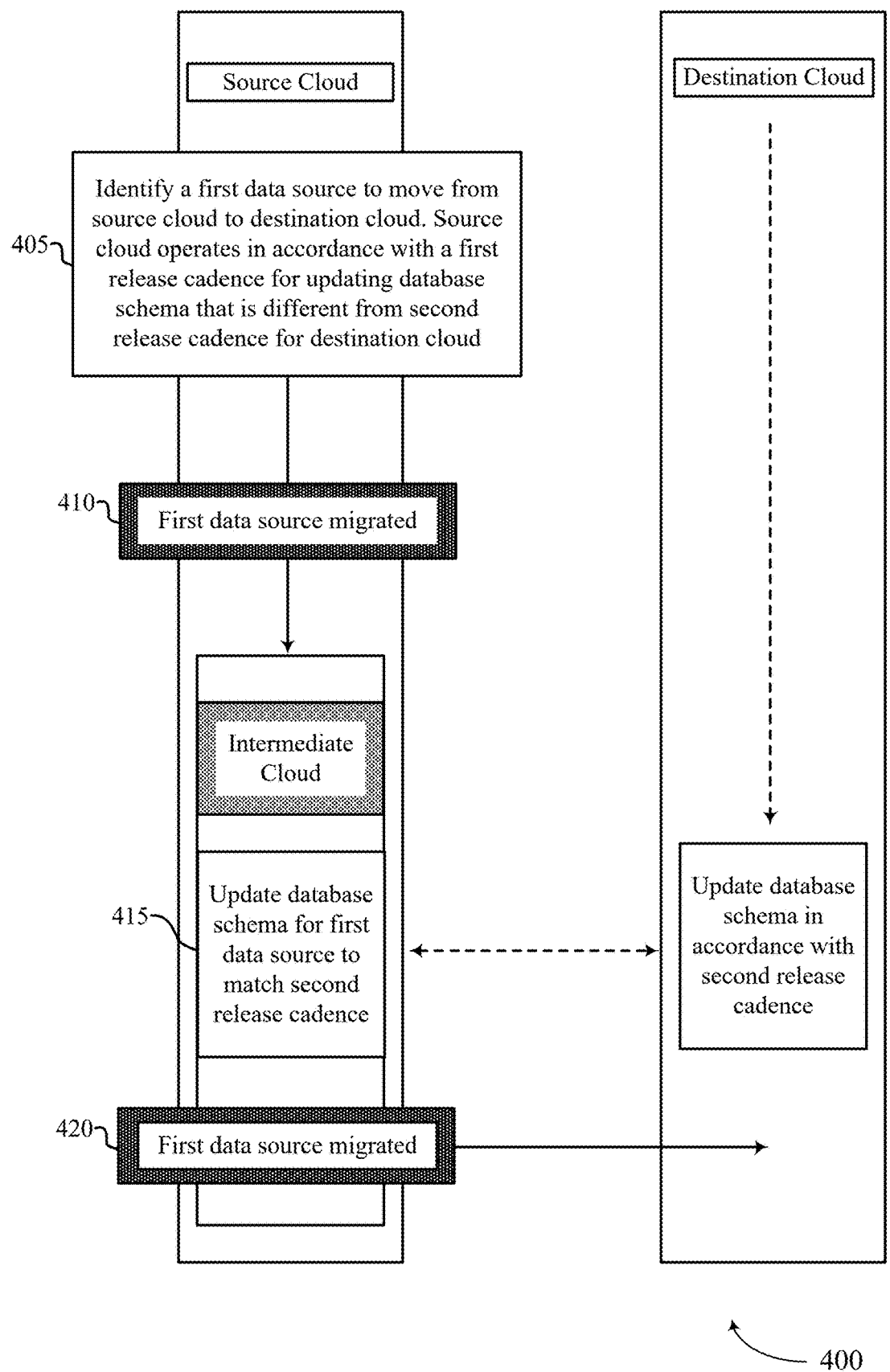
FIG. 4 shows an example of a process flow that supports techniques for handling schema mismatch when migrating databases in accordance with aspects of the present disclosure.

FIG. 4 shows an example of a process flow 400 that supports techniques for handling schema mismatch when migrating databases in accordance with aspects of the present disclosure. For example, the process flow 400 illustrates a process for migrating one or more data sources (e.g., databases) from a source cloud to a destination cloud using an intermediate cloud deployment, which allows for the database schema associated with the one or more data sources to match with a corresponding schema of the destination cloud before migration.

Alternative examples of the following may be implemented. Some steps are performed in a different order than described or are not performed at all. In some implementations, steps may include additional features not mentioned below, or additional steps may be added. Further, although interactions between a source cloud, and intermediate cloud, and a destination cloud are shown in the process flow 400, some aspects of some operations may also be performed by other modules, components, or between different cloud deployments not shown.

At 405, a first data source may be identified for moving from a source cloud deployment to a destination cloud deployment, where the source cloud deployment operates in accordance with a first release cadence for updating database schema and the destination cloud deployment is updated in accordance with a second release cadence for updating database schema. In some examples, the source cloud deployment and the destination cloud deployment may be one of a public cloud deployment, a commercial cloud deployment, a secure cloud deployment, or a FedRAMP cloud deployment. In some aspects, the first release cadence may be different from the second release cadence (e.g., the first release cadence may be relatively more frequent than the second release cadence, or the first release cadence may be relatively less frequent than the second release cadence).

At 410, the first data source may be migrated from the source cloud deployment to an intermediate cloud deployment (that is hosted on the source cloud deployment). In some aspects, a schema associated with the first data source at a time of migration may remain unchanged for a duration that the first data source is hosted at the intermediate cloud deployment. In some examples, the first data source may remain hosted on the intermediate cloud deployment for a duration that is equal to at least a qualification period associated with migration of the first data source to the destination cloud deployment. In some aspects, the duration that the first data source is hosted at the intermediate cloud deployment is a "down time" for the first data source occurring between the migration of the first data source to the intermediate cloud deployment and the migration of the first data source from the intermediate cloud deployment to the destination cloud deployment. In some examples, the first data source may be migrated from the source cloud deployment to the intermediate cloud deployment in accordance with one or more forward compatibility rules, which may maintain the content of the first data source at the source cloud deployment.

At 415, the database schema associated with the first data source may be updated to an updated database schema in accordance with the second release cadence associated with the destination cloud deployment. In some implementations, the database schema associated with the first data source at the intermediate cloud deployment may be updated in conjunction with an update to the database schema of the destination cloud deployment. In some such implementations, the updated database schema of the first data source and the database schema of the destination cloud deployment are identical prior to migration of the first data source from the intermediate cloud deployment to the destination cloud deployment (e.g., the database schema match for the first data source and the destination cloud deployment).

In some cases, the database schema associated with the first data source may be updated at a sequentially next update time for the database schema of the destination cloud deployment (in accordance with the second release cadence).

At 420, the first data source may be migrated from the intermediate cloud deployment to the destination cloud deployment based on the first data source being updated to the updated database schema. In some cases, the database schema associated with the first data source may be identical to a database schema associated with the destination cloud deployment. In some implementations, the intermediate cloud deployment may be discarded subsequent to migration of the first data source from the intermediate cloud deployment to the destination cloud deployment.

Figure 5:
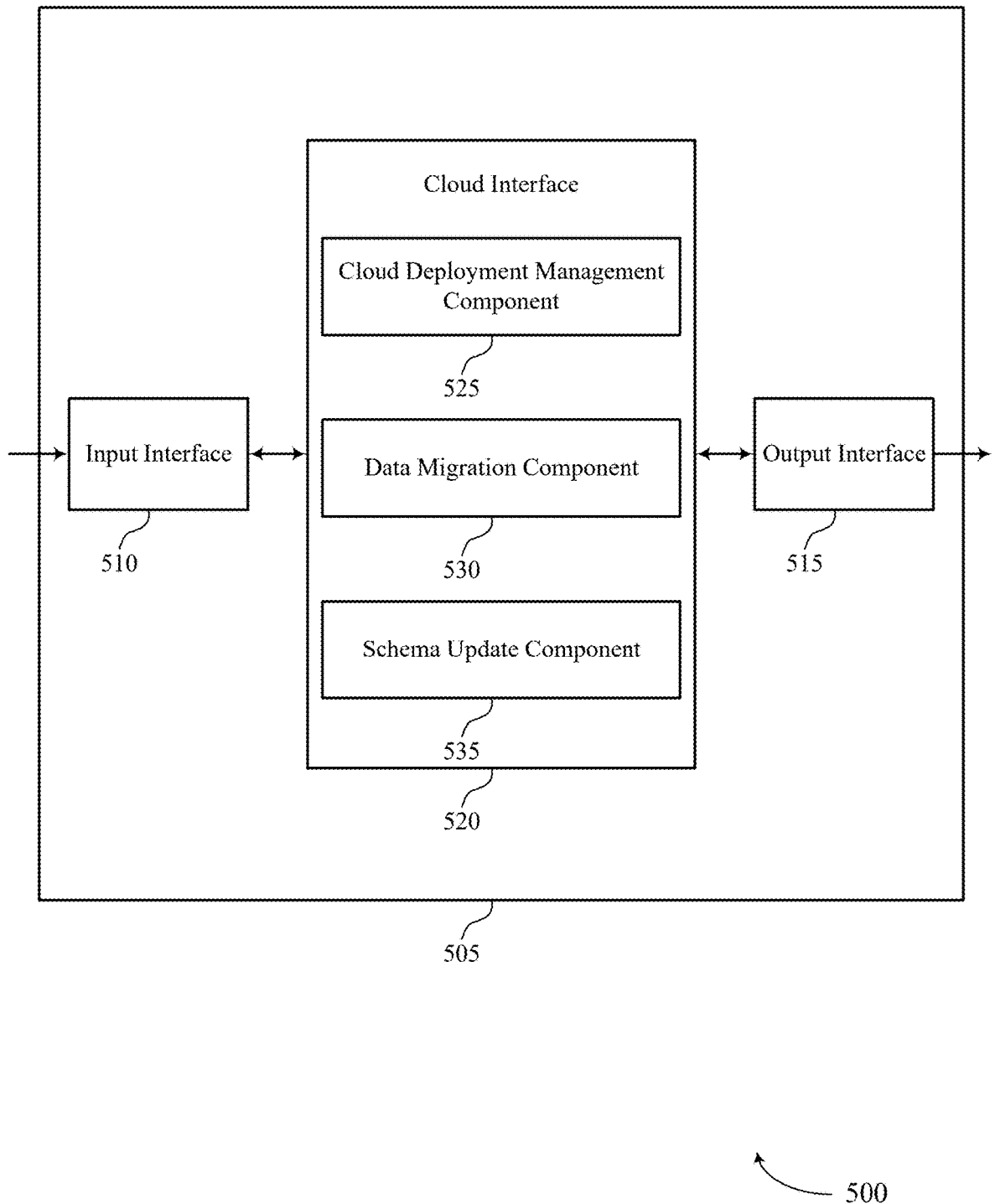
FIG. 5 shows a block diagram of an apparatus that supports techniques for handling schema mismatch when migrating databases in accordance with aspects of the present disclosure.

FIG. 5 shows a block diagram 500 of a system 505 that supports techniques for handling schema mismatch when migrating databases in accordance with aspects of the present disclosure. In some examples, the system 505 may be an example of aspects of one or more components described with reference to FIG. 1, such as a DMS 110. The system 505 may include an input interface 510, an output interface 515, and a cloud interface 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the cloud interface 520 to support techniques for handling schema mismatch when migrating databases. In some cases, the input interface 510 may be a component of a network interface 725 as described with reference to FIG. 7.

The output interface 515 may manage output signaling for the system 505. For example, the output interface 515 may receive signaling from other components of the system 505, such as the cloud interface 520, and may transmit such output signaling corresponding to (e.g., representative of or otherwise based on) such signaling to other systems or devices. In some cases, the output interface 515 may be a component of a network interface 725 as described with reference to FIG. 7.

For example, the cloud interface 520 may include a cloud deployment management component 525, a data migration component 530, a schema update component 535, or any combination thereof. In some examples, the cloud interface 520, or various components thereof, may be configured to perform various operations (e.g., receiving, monitoring, transmitting) using or otherwise in cooperation with the input interface 510, the output interface 515, or both. For example, the cloud interface 520 may receive information from the input interface 510, send information to the output interface 515, or be integrated in combination with the input interface 510, the output interface 515, or both to receive information, transmit information, or perform various other operations as described herein.

The cloud deployment management component 525 may be configured as or otherwise support a means for identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence. The data migration component 530 may be configured as or otherwise support a means for migrating the first data source from the source cloud deployment to an intermediate cloud deployment, where a schema associated with the first data source at a time of migration is unchanged for a duration that the first data source is hosted at the intermediate cloud deployment. The schema update component 535 may be configured as or otherwise support a means for updating the database schema associated with the first data source to an updated database schema in accordance with the second release cadence associated with the destination cloud deployment. The data migration component 530 may be configured as or otherwise support a means for migrating the first data source from the intermediate cloud deployment to the destination cloud deployment based on the updating.

Figure 6:
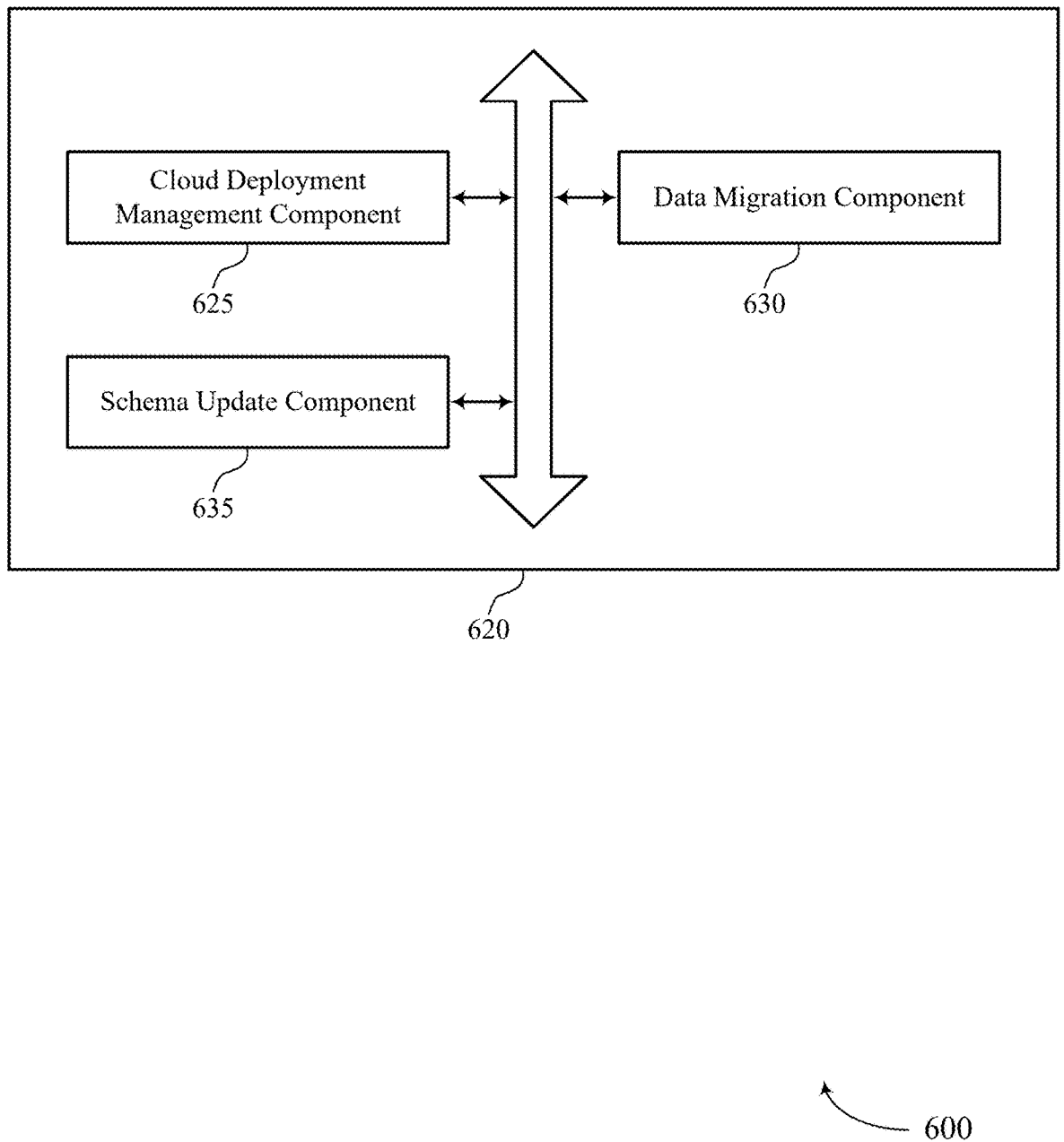
FIG. 6 shows a block diagram of a cloud interface that supports techniques for handling schema mismatch when migrating databases in accordance with aspects of the present disclosure.

FIG. 6 shows a block diagram 600 of a cloud interface 620 that supports techniques for handling schema mismatch when migrating databases in accordance with aspects of the present disclosure. The cloud interface 620 may be an example of aspects of a cloud interface or a cloud interface 520, or both, as described herein. The cloud interface 620, or various components thereof, may be an example of means for performing various aspects of techniques for handling schema mismatch when migrating databases as described herein. For example, the cloud interface 620 may include a cloud deployment management component 625, a data migration component 630, a schema update component 635, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The cloud deployment management component 625 may be configured as or otherwise support a means for identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence. The data migration component 630 may be configured as or otherwise support a means for migrating the first data source from the source cloud deployment to an intermediate cloud deployment, where a schema associated with the first data source at a time of migration is unchanged for a duration that the first data source is hosted at the intermediate cloud deployment. The schema update component 635 may be configured as or otherwise support a means for updating the database schema associated with the first data source to an updated database schema in accordance with the second release cadence associated with the destination cloud deployment. In some examples, the data migration component 630 may be configured as or otherwise support a means for migrating the first data source from the intermediate cloud deployment to the destination cloud deployment based on the updating.

In some examples, to support updating the database schema associated with the first data source to the updated database schema, the schema update component 635 may be configured as or otherwise support a means for updating the database schema associated with the first data source at the intermediate cloud deployment in conjunction with an update to the database schema of the destination cloud deployment, where the updated database schema of the first data source and the database schema of the destination cloud deployment include identical database schema prior to migration of the first data source from the intermediate cloud deployment to the destination cloud deployment.

In some examples, to support updating the database schema associated with the first data source to the updated database schema, the schema update component 635 may be configured as or otherwise support a means for updating the database schema associated with the first data source at a sequentially next update time for the database schema of the destination cloud deployment in accordance with the second release cadence.

In some examples, the database schema associated with the first release cadence of the source cloud deployment is updated more frequently than the database schema associated with the second release cadence of the destination cloud deployment.

In some examples, the database schema associated with the first release cadence of the source cloud deployment is updated less frequently than the database schema associated with the second release cadence of the destination cloud deployment.

In some examples, the source cloud deployment includes a public cloud deployment or a commercial cloud deployment, and the destination cloud deployment includes a FedRAMP cloud deployment or a secure cloud deployment.

In some examples, the source cloud deployment includes a FedRAMP cloud deployment or a secure cloud deployment, and the destination cloud deployment includes a public cloud deployment or a commercial cloud deployment.

In some examples, the duration that the first data source is hosted at the intermediate cloud deployment is based on a qualification period associated with migration of the first data source to the destination cloud deployment.

In some examples, the duration that the first data source is hosted at the intermediate cloud deployment includes a down time for the first data source occurring between the migration of the first data source to the intermediate cloud deployment and the migration of the first data source from the intermediate cloud deployment to the destination cloud deployment.

In some examples, the cloud deployment management component 625 may be configured as or otherwise support a means for discarding the intermediate cloud deployment subsequent to migration of the first data source from the intermediate cloud deployment to the destination cloud deployment.

In some examples, to support migrating the first data source from the source cloud deployment to the intermediate cloud deployment, the data migration component 630 may be configured as or otherwise support a means for migrating the first data source from the source cloud deployment to the intermediate cloud deployment in accordance with one or more forward compatibility rules, where the one or more forward compatibility rules maintain content of the first data source at the source cloud deployment.

In some examples, the intermediate cloud deployment is hosted at the source cloud deployment.

Figure 7:
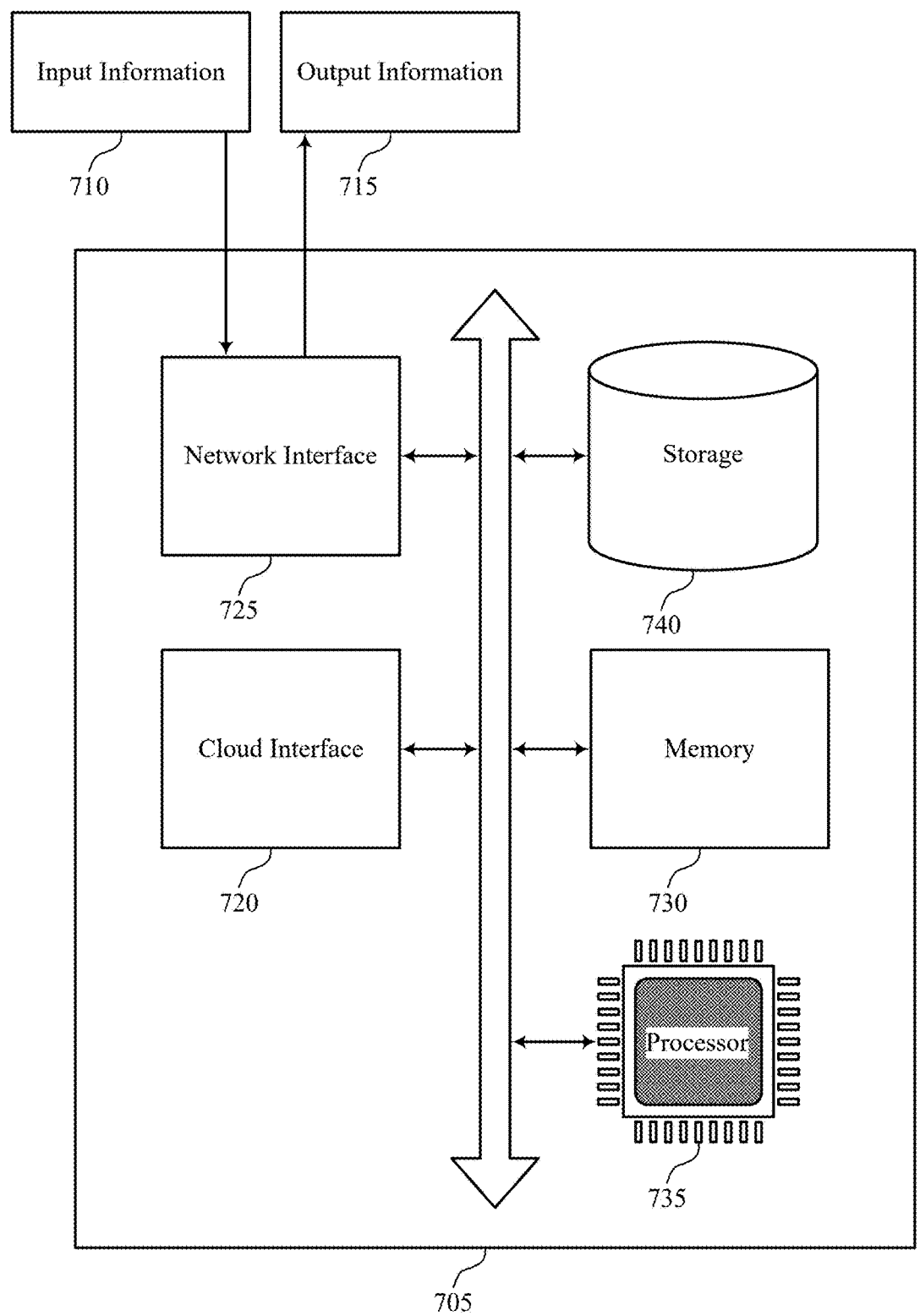
FIG. 7 shows a diagram of a system including a device that supports techniques for handling schema mismatch when migrating databases in accordance with aspects of the present disclosure.

FIG. 7 shows a block diagram 700 of a system 705 that supports techniques for handling schema mismatch when migrating databases in accordance with aspects of the present disclosure. The system 705 may be an example of or include components of a system 505 as described herein. The system 705 may include components for data management, including components such as a cloud interface 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting techniques for handling schema mismatch when migrating databases). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the cloud interface 720 may be configured as or otherwise support a means for identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence. The cloud interface 720 may be configured as or otherwise support a means for migrating the first data source from the source cloud deployment to an intermediate cloud deployment, where a schema associated with the first data source at a time of migration is unchanged for a duration that the first data source is hosted at the intermediate cloud deployment. The cloud interface 720 may be configured as or otherwise support a means for updating the database schema associated with the first data source to an updated database schema in accordance with the second release cadence associated with the destination cloud deployment. The cloud interface 720 may be configured as or otherwise support a means for migrating the first data source from the intermediate cloud deployment to the destination cloud deployment based on the updating.

By including or configuring the cloud interface 720 in accordance with examples as described herein, the system 705 may support techniques for techniques for handling schema mismatch when migrating databases, which may provide one or more benefits such as, for example, improved reliability, reduced latency, improved user experience, more efficient utilization of computing resources, network resources or both, improved scalability, improved security, improved techniques for ensuring matching database scheme when migrating between different cloud deployments, streamlined procedures for migrating databases, among other benefits.

Figure 8:
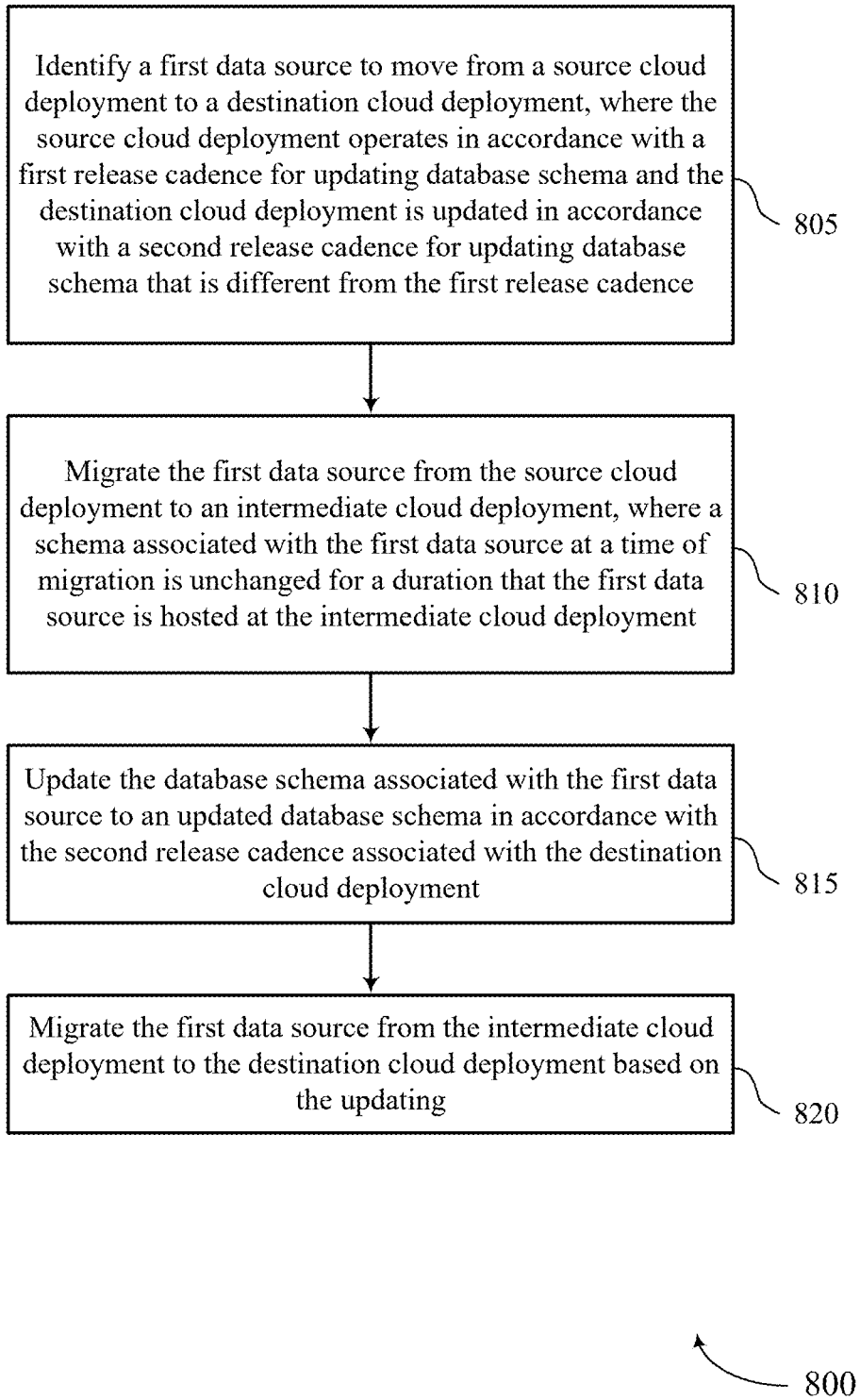
FIGS. 8 and 9 show flowcharts illustrating methods that support techniques for handling schema mismatch when migrating databases in accordance with aspects of the present disclosure.

FIG. 8 shows a flowchart illustrating a method 800 that supports techniques for handling schema mismatch when migrating databases in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence. The operations of 805 may be performed in accordance with examples as disclosed herein. In some examples, aspects of the operations of 805 may be performed by a cloud deployment management component 625 as described with reference to FIG. 6.

At 810, the method may include migrating the first data source from the source cloud deployment to an intermediate cloud deployment, where a schema associated with the first data source at a time of migration is unchanged for a duration that the first data source is hosted at the intermediate cloud deployment. The operations of 810 may be performed in accordance with examples as disclosed herein. In some examples, aspects of the operations of 810 may be performed by a data migration component 630 as described with reference to FIG. 6.

At 815, the method may include updating the database schema associated with the first data source to an updated database schema in accordance with the second release cadence associated with the destination cloud deployment. The operations of 815 may be performed in accordance with examples as disclosed herein. In some examples, aspects of the operations of 815 may be performed by a schema update component 635 as described with reference to FIG. 6.

At 820, the method may include migrating the first data source from the intermediate cloud deployment to the destination cloud deployment based on the updating. The operations of 820 may be performed in accordance with examples as disclosed herein. In some examples, aspects of the operations of 820 may be performed by a data migration component 630 as described with reference to FIG. 6.

Figure 9:
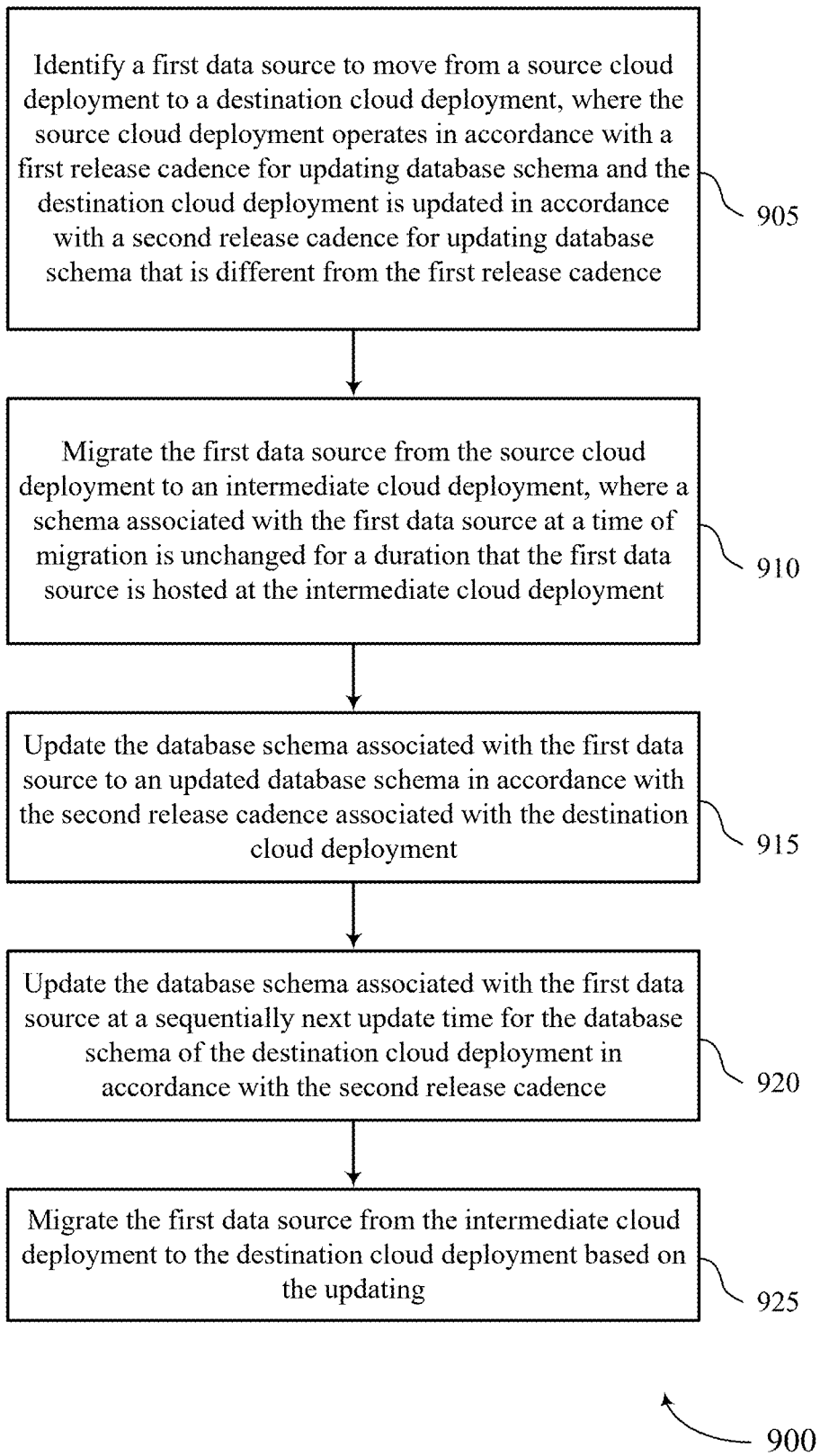

FIG. 9 shows a flowchart illustrating a method 900 that supports techniques for handling schema mismatch when migrating databases in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence. The operations of 905 may be performed in accordance with examples as disclosed herein. In some examples, aspects of the operations of 905 may be performed by a cloud deployment management component 625 as described with reference to FIG. 6.

At 910, the method may include migrating the first data source from the source cloud deployment to an intermediate cloud deployment, where a schema associated with the first data source at a time of migration is unchanged for a duration that the first data source is hosted at the intermediate cloud deployment. The operations of 910 may be performed in accordance with examples as disclosed herein. In some examples, aspects of the operations of 910 may be performed by a data migration component 630 as described with reference to FIG. 6.

At 915, the method may include updating the database schema associated with the first data source to an updated database schema in accordance with the second release cadence associated with the destination cloud deployment. The operations of 915 may be performed in accordance with examples as disclosed herein. In some examples, aspects of the operations of 915 may be performed by a schema update component 635 as described with reference to FIG. 6.

At 920, the method may include updating the database schema associated with the first data source at a sequentially next update time for the database schema of the destination cloud deployment in accordance with the second release cadence. The operations of 920 may be performed in accordance with examples as disclosed herein. In some examples, aspects of the operations of 920 may be performed by a schema update component 635 as described with reference to FIG. 6.

At 925, the method may include migrating the first data source from the intermediate cloud deployment to the destination cloud deployment based on the updating. The operations of 925 may be performed in accordance with examples as disclosed herein. In some examples, aspects of the operations of 925 may be performed by a data migration component 630 as described with reference to FIG. 6.

A method by an apparatus is described. The method may include identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence, migrating the first data source from the source cloud deployment to an intermediate cloud deployment, where a schema associated with the first data source at a time of migration is unchanged for a duration that the first data source is hosted at the intermediate cloud deployment, updating the database schema associated with the first data source to an updated database schema in accordance with the second release cadence associated with the destination cloud deployment, and migrating the first data source from the intermediate cloud deployment to the destination cloud deployment based on the updating.

An apparatus is described. The apparatus may include one or more memories storing processor executable code, and one or more processors coupled with the one or more memories. The one or more processors may individually or collectively be operable to execute the code to cause the apparatus to identify a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence, migrate the first data source from the source cloud deployment to an intermediate cloud deployment, where a schema associated with the first data source at a time of migration is unchanged for a duration that the first data source is hosted at the intermediate cloud deployment, update the database schema associated with the first data source to an updated database schema in accordance with the second release cadence associated with the destination cloud deployment, and migrate the first data source from the intermediate cloud deployment to the destination cloud deployment based on the updating.

Another apparatus is described. The apparatus may include means for identifying a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence, means for migrating the first data source from the source cloud deployment to an intermediate cloud deployment, where a schema associated with the first data source at a time of migration is unchanged for a duration that the first data source is hosted at the intermediate cloud deployment, means for updating the database schema associated with the first data source to an updated database schema in accordance with the second release cadence associated with the destination cloud deployment, and means for migrating the first data source from the intermediate cloud deployment to the destination cloud deployment based on the updating.

A non-transitory computer-readable medium storing code is described. The code may include instructions executable by one or more processors to identify a first data source to move from a source cloud deployment to a destination cloud deployment, where the source cloud deployment operates in accordance with a first release cadence for updating database schema and the destination cloud deployment is updated in accordance with a second release cadence for updating database schema that is different from the first release cadence, migrate the first data source from the source cloud deployment to an intermediate cloud deployment, where a schema associated with the first data source at a time of migration is unchanged for a duration that the first data source is hosted at the intermediate cloud deployment, update the database schema associated with the first data source to an updated database schema in accordance with the second release cadence associated with the destination cloud deployment, and migrate the first data source from the intermediate cloud deployment to the destination cloud deployment based on the updating.

In some examples of the method, apparatus, and non-transitory computer-readable medium described herein, updating the database schema associated with the first data source to the updated database schema may include operations, features, means, or instructions for updating the database schema associated with the first data source at the intermediate cloud deployment in conjunction with an update to the database schema of the destination cloud deployment, where the updated database schema of the first data source and the database schema of the destination cloud deployment include identical database schema prior to migration of the first data source from the intermediate cloud deployment to the destination cloud deployment.

In some examples of the method, apparatus, and non-transitory computer-readable medium described herein, updating the database schema associated with the first data source to the updated database schema may include operations, features, means, or instructions for updating the database schema associated with the first data source at a sequentially next update time for the database schema of the destination cloud deployment in accordance with the second release cadence.

In some examples of the method, apparatus, and non-transitory computer-readable medium described herein, the database schema associated with the first release cadence of the source cloud deployment may be updated more frequently than the database schema associated with the second release cadence of the destination cloud deployment.

In some examples of the method, apparatus, and non-transitory computer-readable medium described herein, the database schema associated with the first release cadence of the source cloud deployment may be updated less frequently than the database schema associated with the second release cadence of the destination cloud deployment.

In some examples of the method, apparatus, and non-transitory computer-readable medium described herein, the source cloud deployment includes a public cloud deployment or a commercial cloud deployment, and the destination cloud deployment includes a FedRAMP cloud deployment or a secure cloud deployment.

In some examples of the method, apparatus, and non-transitory computer-readable medium described herein, the source cloud deployment includes a FedRAMP cloud deployment or a secure cloud deployment, and the destination cloud deployment includes a public cloud deployment or a commercial cloud deployment.

In some examples of the method, apparatus, and non-transitory computer-readable medium described herein, the duration that the first data source may be hosted at the intermediate cloud deployment may be based on a qualification period associated with migration of the first data source to the destination cloud deployment.

In some examples of the method, apparatus, and non-transitory computer-readable medium described herein, the duration that the first data source may be hosted at the intermediate cloud deployment includes a down time for the first data source occurring between the migration of the first data source to the intermediate cloud deployment and the migration of the first data source from the intermediate cloud deployment to the destination cloud deployment.

Some examples of the method, apparatus, and non-transitory computer-readable medium described herein may further include operations, features, means, or instructions for discarding the intermediate cloud deployment subsequent to migration of the first data source from the intermediate cloud deployment to the destination cloud deployment.

In some examples of the method, apparatus, and non-transitory computer-readable medium described herein, migrating the first data source from the source cloud deployment to the intermediate cloud deployment may include operations, features, means, or instructions for migrating the first data source from the source cloud deployment to the intermediate cloud deployment in accordance with one or more forward compatibility rules, where the one or more forward compatibility rules maintain content of the first data source at the source cloud deployment.

In some examples of the method, apparatus, and non-transitory computer-readable medium described herein, the intermediate cloud deployment may be hosted at the source cloud deployment.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   identifying a first data source to move from a source cloud deployment to a destination cloud deployment, wherein the source cloud deployment operates in accordance with a first release cadence for updating database schema and the destination cloud deployment is updated in accordance with a second release cadence for updating database schema that is different from the first release cadence;
   migrating the first data source from the source cloud deployment to an intermediate cloud deployment, wherein a schema associated with the first data source at a time of migration is unchanged for a duration that the first data source is hosted at the intermediate cloud deployment;
   updating the database schema associated with the first data source to an updated database schema in accordance with the second release cadence associated with the destination cloud deployment; and
   migrating the first data source from the intermediate cloud deployment to the destination cloud deployment based at least in part on the updating.

2. The method of claim 1, wherein updating the database schema associated with the first data source to the updated database schema comprises:
   updating the database schema associated with the first data source at the intermediate cloud deployment in conjunction with an update to the database schema of the destination cloud deployment, wherein the updated database schema of the first data source and the database schema of the destination cloud deployment comprise identical database schema prior to migration of the first data source from the intermediate cloud deployment to the destination cloud deployment.

3. The method of claim 1, wherein updating the database schema associated with the first data source to the updated database schema comprises:
   updating the database schema associated with the first data source at a sequentially next update time for the database schema of the destination cloud deployment in accordance with the second release cadence.

4. The method of claim 1, wherein the database schema associated with the first release cadence of the source cloud deployment is updated more frequently than the database schema associated with the second release cadence of the destination cloud deployment.

5. The method of claim 1, wherein the database schema associated with the first release cadence of the source cloud deployment is updated less frequently than the database schema associated with the second release cadence of the destination cloud deployment.

6. The method of claim 1, wherein the source cloud deployment comprises a public cloud deployment or a commercial cloud deployment, and the destination cloud deployment comprises a Federal Risk and Authorization Management Program (FedRAMP) cloud deployment or a secure cloud deployment.

7. The method of claim 1, wherein the source cloud deployment comprises a Federal Risk and Authorization Management Program (FedRAMP) cloud deployment or a secure cloud deployment, and the destination cloud deployment comprises a public cloud deployment or a commercial cloud deployment.

8. The method of claim 1, wherein the duration that the first data source is hosted at the intermediate cloud deployment is based at least in part on a qualification period associated with migration of the first data source to the destination cloud deployment.

9. The method of claim 1, wherein the duration that the first data source is hosted at the intermediate cloud deployment comprises a down time for the first data source occurring between the migration of the first data source to the intermediate cloud deployment and the migration of the first data source from the intermediate cloud deployment to the destination cloud deployment.

10. The method of claim 1, further comprising:
    discarding the intermediate cloud deployment subsequent to migration of the first data source from the intermediate cloud deployment to the destination cloud deployment.

11. The method of claim 1, wherein migrating the first data source from the source cloud deployment to the intermediate cloud deployment comprises:
    migrating the first data source from the source cloud deployment to the intermediate cloud deployment in accordance with one or more forward compatibility rules, wherein the one or more forward compatibility rules maintain content of the first data source at the source cloud deployment.

12. The method of claim 1, wherein the intermediate cloud deployment is hosted at the source cloud deployment.

13. An apparatus, comprising:
    one or more memories storing processor-executable code; and
    one or more processors coupled with the one or more memories and individually or collectively operable to execute the code to cause the apparatus to:
       identify a first data source to move from a source cloud deployment to a destination cloud deployment, wherein the source cloud deployment operates in accordance with a first release cadence for updating database schema and the destination cloud deployment is updated in accordance with a second release cadence for updating database schema that is different from the first release cadence;

migrate the first data source from the source cloud deployment to an intermediate cloud deployment, wherein a schema associated with the first data source at a time of migration is unchanged for a duration that the first data source is hosted at the intermediate cloud deployment;

update the database schema associated with the first data source to an updated database schema in accordance with the second release cadence associated with the destination cloud deployment; and migrate the first data source from the intermediate cloud deployment to the destination cloud deployment based at least in part on the updating.

14. The apparatus of claim 13, wherein, to update the database schema associated with the first data source to the updated database schema, the one or more processors are individually or collectively operable to execute the code to cause the apparatus to:

update the database schema associated with the first data source at the intermediate cloud deployment in conjunction with an update to the database schema of the destination cloud deployment, wherein the updated database schema of the first data source and the database schema of the destination cloud deployment comprise identical database schema prior to migration of the first data source from the intermediate cloud deployment to the destination cloud deployment.

15. The apparatus of claim 13, wherein, to update the database schema associated with the first data source to the updated database schema, the one or more processors are individually or collectively operable to execute the code to cause the apparatus to:

update the database schema associated with the first data source at a sequentially next update time for the database schema of the destination cloud deployment in accordance with the second release cadence.

16. The apparatus of claim 13, wherein the database schema associated with the first release cadence of the source cloud deployment is updated more frequently than the database schema associated with the second release cadence of the destination cloud deployment.

17. The apparatus of claim 13, wherein the database schema associated with the first release cadence of the source cloud deployment is updated less frequently than the database schema associated with the second release cadence of the destination cloud deployment.

18. The apparatus of claim 13, wherein the source cloud deployment comprises a public cloud deployment or a commercial cloud deployment, and the destination cloud deployment comprises a Federal Risk and Authorization Management Program (FedRAMP) cloud deployment or a secure cloud deployment.

19. The apparatus of claim 13, wherein the source cloud deployment comprises a Federal Risk and Authorization Management Program (FedRAMP) cloud deployment or a secure cloud deployment, and the destination cloud deployment comprises a public cloud deployment or a commercial cloud deployment.

20. A non-transitory computer-readable medium storing code, the code comprising instructions executable by one or more processors to:

identify a first data source to move from a source cloud deployment to a destination cloud deployment, wherein the source cloud deployment operates in accordance with a first release cadence for updating database schema and the destination cloud deployment is updated in accordance with a second release cadence for updating database schema that is different from the first release cadence;

migrate the first data source from the source cloud deployment to an intermediate cloud deployment, wherein a schema associated with the first data source at a time of migration is unchanged for a duration that the first data source is hosted at the intermediate cloud deployment;

update the database schema associated with the first data source to an updated database schema in accordance with the second release cadence associated with the destination cloud deployment; and migrate the first data source from the intermediate cloud deployment to the destination cloud deployment based at least in part on the updating.

* * * * *